(12) United States Patent
Ludwig

(10) Patent No.: US 12,151,446 B2
(45) Date of Patent: Nov. 26, 2024

(54) COMPOSITION FOR REDUCING TIRE-WHEEL ASSEMBLY IMBALANCES, FORCE VARIATIONS, AND/OR VIBRATIONS

(71) Applicant: International Marketing, Inc., Chambersburg, PA (US)

(72) Inventor: Stephen Dale Ludwig, Lancaster, PA (US)

(73) Assignee: INTERNATIONAL MARKETING, INC., Chambersburg, PA (US)

(*) Notice: Subject to any disclaimer, the term of this patent is extended or adjusted under 35 U.S.C. 154(b) by 0 days.

(21) Appl. No.: 17/510,518

(22) Filed: Oct. 26, 2021

(65) Prior Publication Data

US 2022/0040944 A1 Feb. 10, 2022

Related U.S. Application Data

(63) Continuation of application No. 16/079,922, filed as application No. PCT/US2017/019643 on Feb. 27, 2017, now Pat. No. 11,173,676.
(Continued)

(51) Int. Cl.
*B29D 30/06* (2006.01)
*B29D 30/04* (2006.01)
(Continued)

(52) U.S. Cl.
CPC ......... *B29D 30/0633* (2013.01); *B29D 30/04* (2013.01); *B60C 19/00* (2013.01);
(Continued)

(58) Field of Classification Search
None
See application file for complete search history.

(56) References Cited

U.S. PATENT DOCUMENTS 2,055,797 A 9/1936 Loomis
2,566,384 A 9/1951 Tilton, Jr.
(Continued)

FOREIGN PATENT DOCUMENTS

CA 649236 A 9/1962
WO 0068658 A1 11/2000
(Continued)

OTHER PUBLICATIONS

International Search Report and Written Opinion for PCT/US2017/019643 dated Feb. 27, 2017.

*Primary Examiner* — Ronak C Patel
(74) *Attorney, Agent, or Firm* — Hahn Loeser & Parks LLP

(57) ABSTRACT

Particular embodiments of the invention comprises a composition for reducing weight imbalances, force variations, and/or vibrations in a tire-wheel assembly, the composition comprising a first plurality of particulate for positioning within the tire-wheel assembly, where each particle in the first plurality of particulate is characterized as having low energy absorption capabilities, and a second plurality of particulate for positioning within the tire-wheel assembly, where each particle in the second plurality of particulate is characterized as having elevated energy absorption capabilities. Additional embodiments of the invention comprise a method for reducing force imbalances, force variations, and/or vibrations in a tire-wheel assembly, which includes the steps of providing a tire-wheel assembly and placing into a pressurization chamber of said tire-wheel assembly a composition as contemplated in any embodiment or combination of embodiments suggested herein.

18 Claims, 5 Drawing Sheets

Related U.S. Application Data

(60) Provisional application No. 62/300,455, filed on Feb. 26, 2016.

(51) Int. Cl.
*B60C 19/00* (2006.01)
*B65D 75/58* (2006.01)

(52) U.S. Cl.
CPC ............ *B60C 19/003* (2013.01); *B65D 75/58* (2013.01); *B29D 2030/0637* (2013.01)

(56) References Cited

U.S. PATENT DOCUMENTS

| | | | |
|---|---|---|---|
| 2,765,018 | A | 10/1956 | Connell |
| 2,909,389 | A | 10/1959 | Wilborn |
| 3,716,093 | A | 2/1973 | Tsuchiya |
| 3,747,660 | A | 7/1973 | Tibbals |
| 3,860,539 | A | 1/1975 | Miyazato |
| 3,881,537 | A | 5/1975 | Miyazato |
| 4,101,494 | A | 7/1978 | Kent et al. |
| 4,137,206 | A | 1/1979 | Kent |
| 4,179,162 | A | 12/1979 | Zarlengo |
| 4,294,730 | A | 10/1981 | Kenney |
| 4,607,065 | A | 8/1986 | Kitamura et al. |
| 4,713,114 | A | 12/1987 | Smith |
| 5,059,636 | A | 10/1991 | Grenga |
| 5,073,217 | A | 12/1991 | Fogal |
| 5,728,243 | A | 3/1998 | Heffernan et al. |
| 5,766,501 | A | 6/1998 | Heffernan et al. |
| 5,856,376 | A | 1/1999 | Wong |
| 5,908,145 | A | 6/1999 | Jaksa |
| 6,128,952 | A | 10/2000 | LeBlanc |
| 6,129,797 | A | 10/2000 | Heffernan et al. |
| 6,249,971 | B1 | 6/2001 | Fogal |
| 6,979,060 | B2 | 12/2005 | Fogal, Sr. et al. |
| 7,022,753 | B2 | 4/2006 | Fogal, Sr. |
| 7,169,830 | B2 | 1/2007 | Fogal, Sr. |
| 7,360,846 | B2 | 4/2008 | Krueger |
| 7,712,840 | B2 | 5/2010 | Fogal, Sr. et al. |
| 9,121,466 | B2 | 9/2015 | Tsugihashi et al. |
| 2003/0155055 | A1 | 8/2003 | Leblanc |
| 2004/0224153 | A1* | 11/2004 | Fogal, Sr. .............. B60C 19/003 |
| | | | 525/934 |
| 2005/0012382 | A1 | 1/2005 | Fogal |
| 2005/0159534 | A1 | 7/2005 | Ronlan |
| 2005/0277712 | A1 | 12/2005 | Daly |
| 2007/0227637 | A1* | 10/2007 | Cude ....................... G01M 1/34 |
| | | | 152/154.1 |
| 2008/0135146 | A1 | 6/2008 | Heffernan et al. |
| 2010/0006195 | A1 | 1/2010 | Seitz |
| 2010/0101692 | A1* | 4/2010 | Fogal, Sr .............. F16F 15/363 |
| | | | 152/154.1 |
| 2010/0175798 | A1* | 7/2010 | Fogal, Sr. ............. F16F 15/363 |
| | | | 152/154.1 |
| 2010/0213755 | A1 | 8/2010 | Fogal, Sr. et al. |
| 2013/0248085 | A1 | 9/2013 | Sugimoto |
| 2014/0360636 | A1 | 12/2014 | McKinlay |

FOREIGN PATENT DOCUMENTS

| | | |
|---|---|---|
| WO | 03002889 A1 | 1/2003 |
| WO | 2010081016 A1 | 7/2010 |
| WO | 2015128349 A1 | 9/2015 |

* cited by examiner

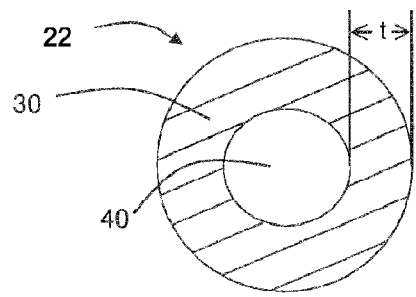
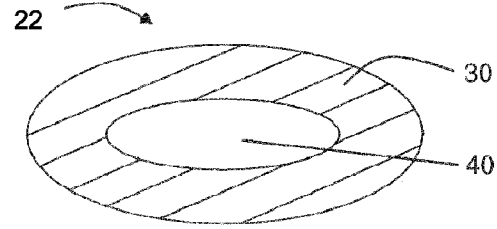
FIG. 6A  FIG. 6B
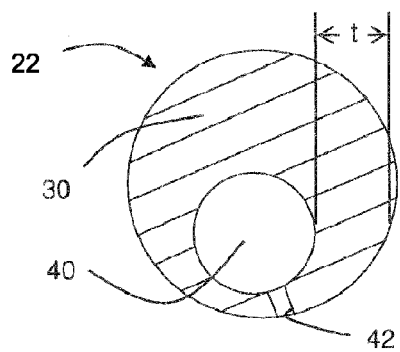
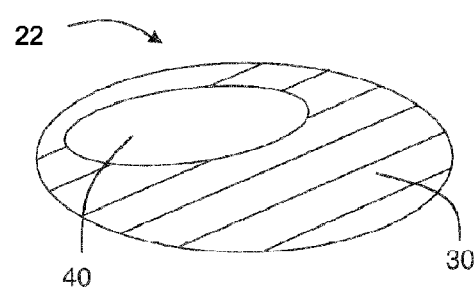
FIG. 7A  FIG. 7B
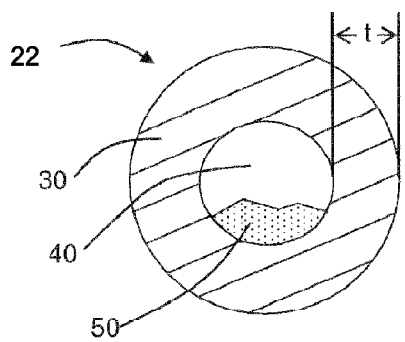
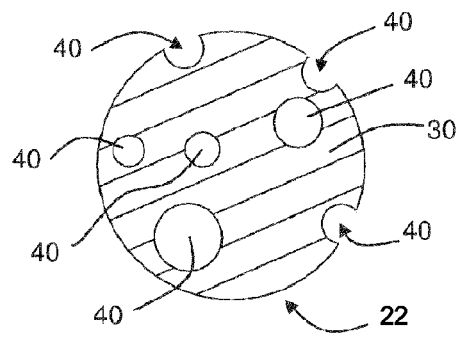
FIG. 8  FIG. 9

COMPOSITION FOR REDUCING TIRE-WHEEL ASSEMBLY IMBALANCES, FORCE VARIATIONS, AND/OR VIBRATIONS

CROSS-REFERENCE TO RELATED APPLICATIONS

This patent application is a continuation of U.S. patent application Ser. No. 16/079,922, filed Aug. 24, 2018 and claims priority to, and the benefit of: U.S. patent application Ser. No. 16/079,922, filed Aug. 24, 2018 with the U.S. Patent Office, which is a National Phase Entry of International patent application no. PCT/US2017/019643, filed Feb. 27, 2017 with the U.S. Patent Office (as a Receiving Office); International patent application no. PCT/US2017/019643, filed Feb. 27, 2017; and, U.S. Provisional Patent Application No. 62/300,455, filed Feb. 26, 2016 with the U.S. Patent Office, where each such prior patent application is hereby incorporated by reference.

BACKGROUND OF THE INVENTION

Field of the Invention

This invention relates to a composition comprising a plurality of particulate for use in reducing weight imbalances, force variations, and/or vibrations acting on a pneumatic tire and/or wheel during operation of a tire and wheel ("tire-wheel") assembly. More specifically, the present invention provides a composition containing particulate having different groupings (sets) of particles, the different groupings having different densities, specific gravities, particle sizes, and/or durometer hardness (also referred to more simply as durometer or hardness), and/or energy absorbing properties.

Description of the Related Art

Tires are utilized by vehicles to improve vehicle handling and ride. Tires, however, are exposed to imbalances and abnormalities and disturbances, which result in force variations and vibrations acting upon the tire and ultimately the vehicle. Ultimately, imbalances, force variations, and vibrations reduce vehicle handling, stability, and ride, while also causing excessive tire wear. Accordingly, it is generally desirous to reduce, if not eliminate, imbalances, force variations, and vibrations that act upon the tire, the tire-wheel assembly, and ultimately the vehicle.

A vehicle generally comprises an unsprung mass and a sprung mass. The unsprung mass generally includes portions of the vehicle not supported by the vehicle suspension system, such as, for example, the tire-wheel assembly, steering knuckles, brakes and axles. The sprung mass, conversely, generally comprises the remaining portions of the vehicle supported by the vehicle suspension system. The unsprung mass can be susceptible to disturbances and vibration originating from a variety of sources, such as worn joints, wheel misalignment, wheel non-uniformities, and brake drag. Disturbances and vibrations may also originate from a tire, which may be caused by tire imperfections, such as tire imbalance, tire non-uniformities, and irregular tread wear.

A tire imbalance generally results from a non-uniform distribution of weight around the tire relative to the tire's axis of rotation. An imbalance may also arise when the tire weight is not uniform from side-to-side, or laterally, along the tire. Tire imbalances may be cured by placing additional weight at particular locations to provide a balanced distribution of weight about the tire. Balance weights, such as clip-on lead weights or lead tape weights, are often used to correct tire imbalance and balance the tire-wheel assembly. The balance weights are applied to the wheel in a position directed by a balancing machine. Balancing may also be achieved by inserting a plurality of particulate (particles) into the tire pressurization chamber, which is forced against the tire inner surface by centrifugal forces to correct any imbalance. However, even perfect balancing of the tire-wheel assembly does not ensure that the tire will be exposed to other disturbances and vibrations. Even a perfectly balanced tire can have severe vibrations, which may result from non-uniformities in the tire, such as with retreaded tires. Accordingly, a balanced tire-wheel assembly may not correct non-uniformities affecting the tire-wheel assembly during vehicle operation.

Tire non-uniformities are imperfections in the shape and construction of a tire. Non-uniformities affect the performance of a tire, and, accordingly, the effects of which can be measured and quantified by determining particular dynamic properties of a loaded tire. Non-uniformities also cause a variation of forces acting on tire through its footprint. For example, a tire may have a particular conicity, which is the tendency of a tire to roll like a cone, whereby the tire translates laterally as the tire rotates under load. Also, a tire may experience ply steer, which also quantifies a tire's tendency to translate laterally during tire operation; however, this is due to the directional arrangement of tire components within the tire, as opposed to the physical shape of the tire. Accordingly, force variations may be exerted by the tire as it rotates under load, which means that different force levels may be exerted by the tire as portions of the tire having different spring constants enter and exit the tire footprint (the portion of the tire engaging the surface upon which the tire operates). Non-uniformities are measured by a force variation machine.

Force variations may occur in different directions relative to the tire, and, accordingly, may be quantified as radial (vertical), lateral (side-to-side), and tangential (fore-aft) force variations. Radial force variations operate perpendicular to the tire rotational axis along a vertical axis extending upward from the surface upon which the tire operates, and through the center of the tire. Radial forces are strongest in the vertical direction (e.g., wheel "hop"), such as during the first tire harmonic vibration. Radial forces may also have a horizontal (fore-aft, or "surge") component due to, for example, the radial centrifugal force of a net mass imbalance in the rotating tire. Lateral force variations are directed axially relative to the tire's rotational axis, while tangential force variations are directed perpendicularly to both radial and lateral force variation directions, which is generally in the forward and rearward direction of travel of the tire. Lateral forces cause either tire wobble or a constant steering force. Tangential forces, or fore-aft forces, generally act along the tire footprint in the direction of tire travel, or, in other words, in a direction both tangential to the tire's outer circumference (e.g., tread surface) and perpendicular to the tire's axis of rotation (thus also perpendicular to the radial and lateral forces). Tangential force variations are experienced as a "push-pull" effect on a tire. Force variations may also occur due to the misalignment of the tire-wheel assembly.

Because tires support the sprung mass of a vehicle, any dynamic irregularities or disturbances experienced by the tire will cause the transmission of undesirable disturbances and vibrations to the sprung mass of the vehicle, and may result in an undesirable or rough vehicle ride, as well as a reduction in vehicle handling and stability. Severe vibration can result in dangerous conditions, such as wheel tramp or hop and wheel shimmy (shaking side-to-side). Radial force variations are generally not speed dependent, while fore/aft force variations may vary greatly with speed. Tangential force variations are generally insignificant below 40 mph; however, tangential force variations surpass radial force variations as the dominant cause of unacceptable vibration of a balanced tire rotating at over 60 mph and can quickly grow to be a magnitude of twice the radial force variation at speeds approaching 80 mph. Currently, there are no viable methods for reducing tangential force variations.

Methods have been developed to correct for excessive force variations by removing rubber from the shoulders and/or the central region of the tire tread by means such as grinding. These methods are commonly performed with a force variation or uniformity machine which includes an assembly for rotating a test tire against the surface of a freely rotating loading drum. This arrangement results in the loading drum being moved in a manner dependent on the forces exerted by the rotating tire whereby forces may be measured by appropriately placed measuring devices. A computer interprets the force measurements and grinders controlled by the computer remove rubber from the tire tread. However, grinding of the tire has certain disadvantages. For example, grinding can reduce the useful tread life of the tire, it may render the tire visually unappealing or it can lead to the development of irregular wear when the tire is in service on a vehicle. Studies have shown that grinding does not reduce tangential force variation (Dorfi, "Tire Non-Uniformities and Steering Wheel Vibrations," *Tire Science & Technology*, TSTCA, Vol. 33, no. 2, April-June 2005 p 90-91). In fact, grinding of the tire can also increase tangential force variations within a tire.

Presently, there is a need to effectively reduce tire imbalance, force variations, and vibrations. This would allow tires having excessive force variations to be used. For example, new tires having excessive force variations may be used instead of being discarded. Further, there is a need to reduced and/or correct force variations and vibrations that develop during the life of a tire, such as due to tire wear or misalignment of a vehicle component, where such reduction and/or correction may occur concurrently as any such force variation and/or vibration develops (i.e., without dismounting to analyze and/or correct each such tire after a performance issue is identified). There also remains a need to reducing rolling resistance and reduce impact energy loss at the tire footprint.

SUMMARY OF THE INVENTION

Particular embodiments of the invention comprises a composition for reducing weight imbalances, force variations, and/or vibrations in a tire-wheel assembly, the composition comprising a first plurality (set or grouping) of particulate (particles) for positioning within the tire-wheel assembly, where each particle in the first plurality of particulate is characterized as having low energy absorption capabilities, and a second plurality (set or grouping) of particulate (particles) for positioning within the tire-wheel assembly, where each particle in the second plurality of particulate is characterized as having elevated energy absorption capabilities.

Additional embodiments of the invention comprise a method for reducing force imbalances, force variations, and/or vibrations in a tire-wheel assembly, which includes the steps of providing a tire-wheel assembly and placing into a pressurization chamber of said tire-wheel assembly a composition as contemplated in any embodiment or combination of embodiments suggested herein.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

FIG. 6A is a cross-section view of a spherical particle having a central chamber (i.e., void) to provide a rotationally weight balanced particle, according to one embodiment of the present invention.

FIG. 6B is a cross-section view of an ellipsoid-shaped particle having a central chamber, according to one embodiment of the present invention.

FIG. 7A is a cross-sectional view of a spheroid-shaped particle having a hole (aperture) extending from a non-centrally positioned void, the hole extending between such void and the exterior of the corresponding particle, according to another alternative embodiment of the present invention.

FIG. 7B is a cross-sectional view of an ellipsoid-shaped particle having a non-central internal chamber, according to another alternative embodiment of the present invention.

FIG. 8 is a cross-sectional view of a spherical particle having a central chamber partially filled with a second material or medium, according to another alternative embodiment of the present invention.

FIG. 9 is a cross-sectional view of a spherical particle having a plurality of chambers located internally and along an exterior surface of such particle, according to another alternative embodiment of the present invention.

DETAILED DESCRIPTION OF THE DRAWINGS

Figure 1:
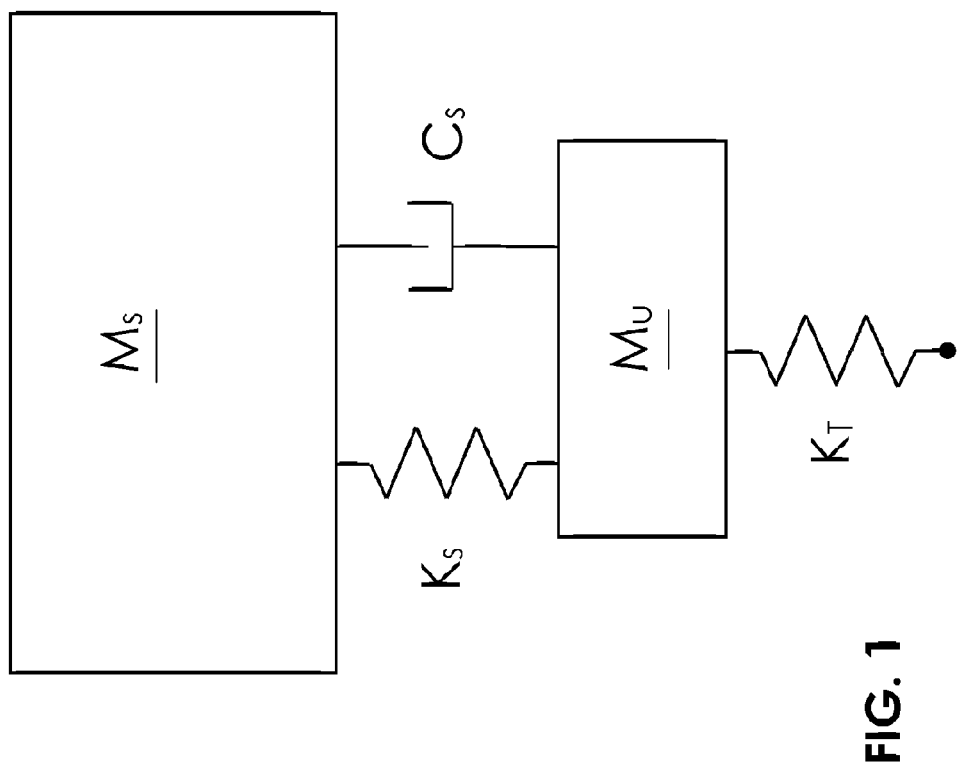
FIG. 1 shows a single wheel model of a vehicle showing the relationship of the sprung mass and the unsprung mass.

Reference is first made to FIG. 1 of the drawings which shows a single wheel model of a vehicle where symbol $M_s$ denotes the mass of a sprung vehicle structure (hereafter referred to as sprung mass) and $M_u$ denotes the mass of an unsprung structure (hereafter referred to as unsprung mass). The unsprung mass $M_u$ generally consists of all of the parts of the vehicle not supported by the vehicle suspension system such as the tire-wheel assembly, steering knuckles, brakes and axles. The sprung mass $M_s$, conversely is all of the parts of the vehicle supported by the vehicle suspension system. Symbol $K_s$ denotes the spring constant of a vehicle spring, and $C_s$ denotes the damping force of the shock absorber. The unsprung mass $M_u$ can be susceptible to disturbances and vibration from a variety of sources such as worn joints, misalignment of the wheel, brake drag, irregular tire wear, etc. Unsprung mass $M_u$ may also be susceptible to imbalances in the tire or wheel, or tire-wheel assembly. The vehicular tires are resilient and support the sprung mass $M_s$ of a vehicle on a road surface as represented by the spring rate of the tires as symbol $K_t$. Any tire or wheel non-uniformities result in a variable spring rate $K_t$ which, as the tire rotates, can cause vibration of the unsprung mass $M_u$. Further, any obstacle encountered by the tire during its operation results in an impact, which causes force variations and vibrations that propagate through the tire and ultimately to the sprung mass $M_s$ of the vehicle. In each instance, the imbalances, force variations, and/or vibrations are transmitted to the sprung mass $M_s$, thereby reducing vehicle ride, stability, and/or handling.

Figure 3:
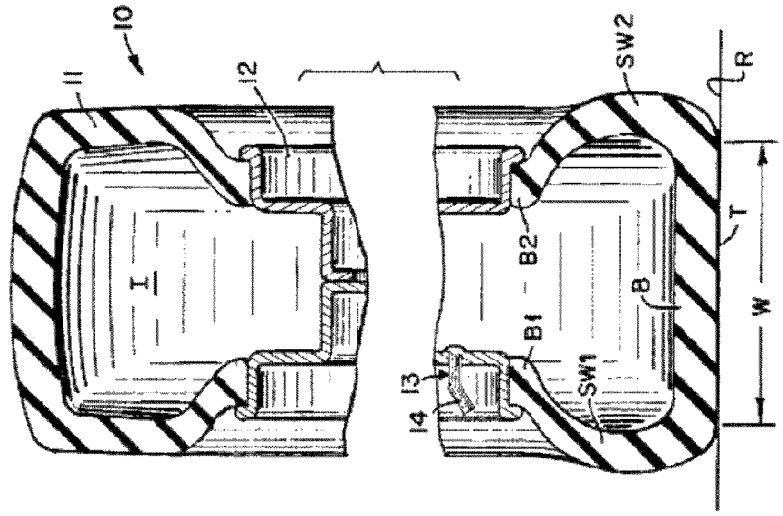
FIG. 3 is an axial vertical cross sectional view of a conventional rear position unsprung mass of vehicle including the tire-wheel assembly of FIG. 2 and additionally illustrates the lateral extent of the footprint when the tire rests under load upon the road surface.
Figure 2:
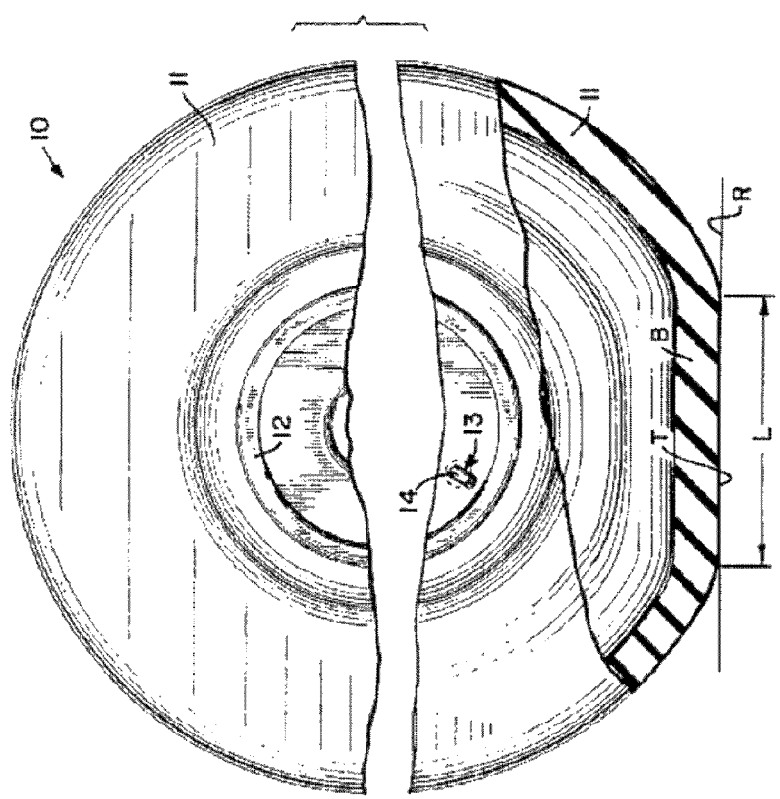
FIG. 2 is a fragmentary side elevational view of a conventional tire-wheel assembly including a tire carried by a rim, and illustrates a lower portion or "footprint" of the tire tread resting upon and bearing against an associated supporting surface, such as a road.

Referring now to FIGS. 2 and 3 of the drawings, a tire-wheel assembly 10 is illustrated, which is an element of the unsprung mass $M_u$ referred to in FIG. 1. A tire 11 and a wheel (i.e., rim) 12 having a tire inflation valve define the tire-wheel assembly 10. A tire tends to flex radially, and sidewalls SW1, SW2 (FIGS. 2, 3 and 4) which tend to bulge outwardly under load when resting or running upon an operating surface R, which may be, for example, a ground or a road surface. The amount of flex will vary depending upon the tire construction and inflation, as well as the loads acting upon the tire 11. Tire 11 engages an operating surface R with a tread T, which forms a footprint FP as the tread is forced against operating surface R. Footprint FP forms a contact surface having a shape having a length L and a lateral width W. Tire 11 also includes beads B1, B2 for securing tire 11 upon wheel 12. Due to tire deflection, tread compression, and/or frictional losses, tire 11 resists rolling under load. Accordingly, each tire 11 has a measurable rolling resistance when operating under load.

Correction of tire-wheel imbalances and non-uniformities associated with the unsprung mass of a vehicle is beneficial for reducing undesired vibrations that are detrimental to the handling, longevity, and overall performance of the vehicle and its tires. If imbalances and non-uniformities are not corrected, excessive force variations may cause excessive vibrations and/or less than optimum vehicle handling, stability, and ride, as well as excessive wear of the tires and other vehicle components. As previously mentioned, non-uniformities and vibrations may exist even if the tire-wheel assembly is balanced (i.e., mass balanced with weights), as non-uniformities may independently exist in the tire, and/or result from brake drag, worn steering or suspension linkages, changing road conditions, tire wear or misalignment, and one or more tires impacting an obstacle ("obstacle impact"), for example. Therefore, in addition to correcting any tire or wheel imbalance, there is also a present need to reduce, minimize, and/or correct force variations and vibrations arising during operation of tire-wheel assembly, and to achieve such in a short period of time (i.e., to minimize the response time for making these force and vibration corrections). This response period is also referred to as the restitution period.

To reduce, minimize, and/or correct weight imbalances, force variations, and/or vibrations generated by, acting on, or otherwise associated with a tire-wheel assembly, a composition comprising a plurality of particles (particulate) is inserted into a pressurization chamber within tire-wheel assembly. The composition is identified as reference numeral 20 in a specific embodiment shown in FIG. 4 while particles forming the composition are identified as reference numeral 22 with regard to specific embodiments shown in FIGS. 6-11. The composition generally comprises a first set (or plurality) of particles and a second set (or plurality) of particles. By definition, each set of particles forms a plurality of particles, where each particle in the first set of particles is characterized as having low energy absorption properties (capabilities), while each particle in the second set of particles is characterized as having elevated energy absorption properties (capabilities). For example, in particular instances, each particle in the first set of particles is characterized as having a specific gravity of at least 1.1 and a shore D hardness (which is a durometer hardness, as noted previously) equal to or greater than 50, and where each particle in the second set of particles is characterized as having a specific gravity equal to or less than 1.3 and a shore D hardness less than 30. Variations of these embodiment include each particle in the first set of particles being characterized as having a specific gravity in the range of 0.85 to 1.75, 1.1 to 1.75, 1.3 to 1.55, or 1.3 to 1.4 and/or as having a Shore D hardness equal to or greater than 70 or 80 or in the range of 80 to 95 or 80 to 85. The first set of particles may be formed at least partially, substantially, or completely from any plastic, which in particular instances is a thermoset plastic, which may be formed of urea or urea-formaldehyde resin, for example. Substantially, as used herein with regard to material content, means completely except for the inclusion of a trace of other materials, such as relating to a manufacturing tolerance. In combination with any first set of particles described herein, in particular instances, each particle in the second plurality of particles is characterized as having a specific gravity in the range of 0.9 to 1.3 or 1.1 to 1.2 and/or as having shore D hardness in the range of 10 to 30 or 10 to 20. The second set of particles may be formed at least partially, substantially, or completely of an elastomeric material, which in particular instance is a natural or synthetic rubber composition.

As to the size of each particle described above, in particular embodiments of the composition described above or elsewhere herein, each particle in the first set of particles is as large as a 4 screen size (that is, is 4.75 mm or less in size), 5 screen size (that is, is 4 mm or less in size), 8 screen size (that is, is 2.36 mm or less in size), 10 screen size (that is, is 2.0 mm or less in size), or a 16 screen size (that is, is 1.18 mm or less in size). In more particular instances of the composition described above, each particle in the first set of particles forms a blend of particle sizes. For example, in certain instances, a majority (over 50%) to substantially all (90% or more) of the particles are screen size 20 or of smaller screen size (that is, 0.841 mm or larger—or at least 0.841 mm). In other instances, a majority (over 50%) to substantially all (90% or more) of the first set of particles are 8 screen size to 12 screen size (that is, sized 2.36 mm to 1.70 mm). In yet other instances, a majority (over 50%) to substantially all (90% or more) of the first set of particles are 10 screen size to 20 screen size (that is, sized 1.70 mm to 0.841 mm). In further instances, a majority (over 50%) to substantially all (90% or more) of the first set of particles are 16 screen size to 20 screen size (that is, sized 1.18 mm to 0.841 mm). In any embodiment described above, the balance of the particles required to reach 100% particle content, if required at all (meaning, if not already at 100% particle content), in certain instances are smaller (that is, of higher screen size). In particular instances, 90% of the first particles are 16 to 20 screen size, 9% are 10 to 16 screen size (1.18 mm to 1.70 mm), and 1% are 20 screen size or smaller (0.841 mm or less). As for the second set of particles, for any first set of particles contemplated above or elsewhere herein, in particular embodiments, a majority to substantially all particles in the second set of particles are sized to either (1) have a maximum dimension of at least 0.841 mm (screen size of 20) or at least 1.0 mm (screen size of 18), or (2) a size in the range of 1.0 mm to 4 mm (screen size of 18 to 5), where the balance of the particle content for the second set may or may not be comprised of smaller particles (that is, of higher screen size). It is appreciated that the first and second set of particles are not limited to those specifically described herein, and may comprise other sizes or size ranges. In more particular instances, the second set of particles comprises a majority of particles or substantially all particles sized from 1.40 mm to 2.80 mm (screen size of 7 to 14). It is appreciated that each particle in each set of particles may be smaller, but in certain instances, each particle is sized so the composition is unable to enter into a gas passageway extending through any valve stem containing a valve core (which is also referred to herein as a pressurization valve, valve, or a tire valve stem-valve core combination), where the passageway has a minimum opening of approximately 0.762 mm for a Schrader valve stem/valve core, meaning, in particular embodiments each of the particles of any set is greater than 0.762 mm. Regardless, as the gas passageway size of any tire valve stem-vale core combination may change over time, more generally, in certain embodiments, the maximum dimension for any particle for any set of particles is sized to be larger than the gas passageway of a tire valve stem-valve core combination different (larger, smaller) from those sizes specifically identified above. By doing so, no filter is needed to prevent particles from entering into the gas passageway. Still, it is appreciated that other sizes may be employed regardless of the size of the gas passageway of any tire valve stem-valve core combination. By definition, maximum dimension means the maximum of the particles measured length, width, or thickness, each of which may form a diameter of a spherical particle. As to the ratio of the first and second sets of particles in the composition, in particular instances, the ratio of the first set of particles to the second set of particles is in the range of 3 to 1 and 1 to 1, or, in other words, the composition may comprise 75% to 50% of the first set of particles and 25% to 50% of the second set of particles.

Particular embodiments of the compositions described herein have been tested on vehicles against EQUAL® tire balancing composition formed of urea (urea-formaldehyde resin) particles ranging in size from 16 to 100 screen size, with most being 30 to 100 screen size, which is a composition described in U.S. Pat. No. 6,249,971. In a series of tests, different tire/wheel balancing compositions were tested on a common vehicle under common testing conditions. In a particular series of tests, 3 ounces (oz.) of EQUAL® was placed into the pressurization chamber for each tire/wheel assembly on a Toyota Tacoma (that is, for each left and right front and rear position) on a highway in each of a northbound lane and southbound lane, where peak vertical accelerations were measured. Those results were compared against one of the new tire/wheel balancing compositions described herein, namely, a composition comprising 75% of a first set of particles and 25% of a second set of particles, where the first set comprised urea particles where 90% thereof were 16 to 20 in screen size, 9% were 10 to 16 in screen size (1.18 mm to 1.70 mm), and 1% were 20 screen size or smaller (0.841 mm or less), and where substantially all of the second set of particles comprised rubber particles 7 to 14 in screen size (1.40 mm to 2.80 mm). In testing this new tire/wheel balancing composition, the tests were conducted in the same manner as was EQUAL® on the same Toyota Tacoma, where 3 oz. of the new tire/wheel composition were arranged in each of the four tire/wheel assemblies. In summary, a reduction in peak vertical acceleration was observed in each wheel position using the new composition in comparison to EQUAL®. Specifically, the average reduction (improvement) in peak vertical acceleration was observed for each wheel position as follows: 2.0% for right front (RF); 8.0% for left front (LF); 3.0% for right rear (RR); and, 5.8% for left rear (LR)—which results in an overall improvement of 4.7% for the vehicle. The same tests were conducted on a semi-tractor using 10 oz. of the same compositions, on the same stretch of highway, and similar results were obtained. Specifically, an average 4.0% improvement (average reduction) in peak vertical acceleration was observed when using the new composition as compared to EQUAL® for each of the front right and left wheel positions. Measurements were not taken at the rear wheel positions. Additionally, while axial peak accelerations did not change at the driver's seat, when measuring the peaks for each of a $1^{st}$ and $2^{nd}$ harmonic for the axial peak acceleration, an average 10% improvement (reduction) and an average 33% improvement (reduction) was observed with the new composition as compared to EQUAL®. This is consistent with feedback received from the driver, indicating a noticeable improvement was felt when using the new composition in comparison to EQUAL®. It is noted that when making these comments, the driver was not aware which tests utilized EQUAL® and which tests utilized the new composition.

Figure 5:
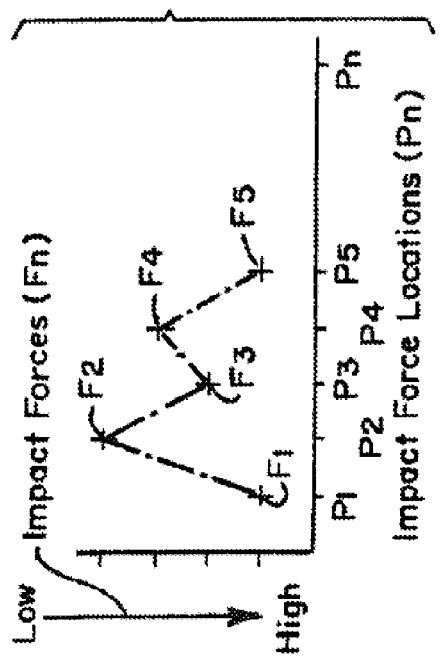
FIG. 5 is a graph, and illustrates the relationship of the impact forces to the location of the particle mixture relative to the tire when under rolling/running conditions during equalizing in accordance with FIG. 4.
Figure 10:
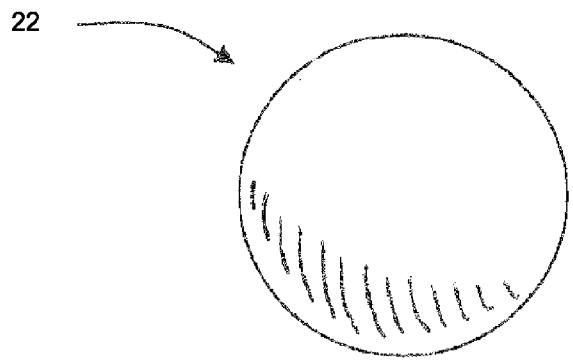
FIG. 10 is a perspective view of a spheroid-shaped particle, such as is shown in FIGS. 6A, 7A, and 8.
Figure 11:
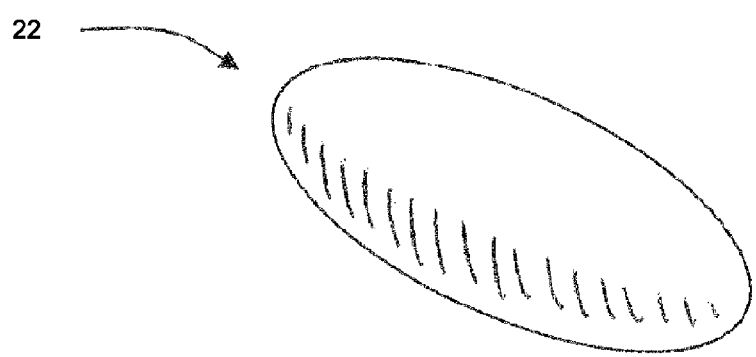
FIG. 11 is a perspective view of an ellipsoid-shaped particle, such as is shown in FIGS. 6B and 7B.

With reference to particular embodiments shown in FIGS. 2, 3 and 5, pressurization chamber I is generally positioned between tire 11 and wheel 12. In the exemplary embodiment shown in FIG. 5, particulate composition 20 is arranged within the pressurization chamber I to reduce and/or substantially eliminate any mass or weight imbalance associated with tire-wheel assembly 10 (i.e., associated with the tire 11 or wheel 12). Further, particulate composition 20 may also be able to reduce radial, lateral, and even tangential force variations, and reduce or dampen vibrations operating through tire 11 and the unsprung mass of a vehicle. Still further, particulate composition 20 may also reduce tire rolling resistance. Because particulate composition 20 is free flowing within pressurization chamber I, particulate composition 20 is able to alter its position within the chamber, as necessary, to adapt to and reduce any mass or weight imbalance, force variations, and/or vibrations that may arise during tire 11 operation, and during the operational life of the tire 11 and/or wheel 12 of the tire-wheel assembly 10. Reduction and/or correction of any mass or weight imbalance of the tire 11 and/or wheel 12 may be achieved in lieu of using other tire balancing products, such as, for example, lead weights. Still, in other embodiments, tire balancing weights or any other tire balancing product may be used in conjunction with composition 20.

The composition may be inserted into the pressurization chamber of the tire-wheel assembly in any desired manner.

For example, the composition may be inserted into pressurization chamber through a tire pressurization valve, or, when each particle in the composition is sized larger than the valve opening, the composition may be placed into the pressurization chamber directly prior to the tire being fully mounted on the wheel. When placing the composition within the pressurization chamber other than through the pressurization valve, the composition may be placed into the pressurization chamber in a free-form or in a collective form, such as, for example, within a degradable bag or as a briquette. In operation, the bag or briquette would deteriorate or break up during subsequent tire operation, as the pressurization chamber warms and/or the bag or briquette tumbles during tire operation, to convert the composition into a free-form. This process may be repeated with each tire-wheel assembly of a vehicle, and, once completed, each tire-wheel assembly may be rotated with reduced force variations and vibrations, which are dampened and/or absorbed by the composition.

It is appreciated that any particle of the composition may contain one or more voids. In particular embodiments, the one or more voids increase the energy absorption properties of a particle. Therefore, in certain instances, one or more particles of the second set of particles of the composition characterized as having elevated energy absorbing properties contain one or more voids. For example, referring now to FIGS. 6A and 6B, certain particles 22 of composition include one or more voids (i.e., chambers) 40 within particle body 30. Voids 40 may be provided to increase the balancing and/or energy absorbing capabilities of a respective particle 22. For example, voids 40 may contain air or any other gas, or may be at least partially filled with any other solid or fluid material, such as, for example, a viscous or viscoelastic energy absorbing material, to affect the deformation and/or rebound of the particle. For example, a particle having a void 40 may more significantly deform when the particle impacts the interior of a tire during tire operation, than a particle not having a void 40. By permitting increased deformation of a particle, more energy is absorbed by the particle and the force variations and/or vibrations operating through or within the tire are further reduced. In particular arrangements, the particle interior or void 40 may be filled with a viscoelastic material for improved energy absorption capabilities, while the exterior of particle 22 may be formed of a more durable material, which may better withstand the environment and impact within the tire and increase the useful life of a particle. Further, voids 40 may contain weight material or balancing material that improves the capability of the corresponding particle 22 to reduce or correct any mass or weight balance of tire-wheel assembly 10, where such balancing material may, for example, have a higher density or specific gravity than the material forming the surrounding body 30 of a particle 22.

In particular embodiments, such as shown by example in FIG. 7A, one or more holes or apertures 42 may extend from a void 40, between such void 40 and the exterior of the corresponding particle, so to allow the void 40 to vent and allow the particle to deform (or compress) more upon particle impact during tire operation, and/or reduce the compression or increased pressurization of any air or gas within the void 40. This may operate to further reduce the particle's ability to rebound upon particle impact during tire operation (or, in other words, increase the energy-absorbing capacity of the composition 20 during tire operation), since the gas or air is allowed to vent into the tire's interior chamber I during tire impact, which reduces the ability of the particle to further compress the air or gas contained within the void 40 as it is deformed during impact. It is contemplated that each hole or aperture 42 may comprise any shape or size.

It is appreciated that each particle within composition may form any desired shape. For example, with reference to the examples shown in FIGS. 6A and 6B, each particle 22 forms spheroid or an ellipsoid, respectively, which specifically includes being spherically-shaped, as shown by example in FIG. 6A. Each particle may be shaped to improve the reduction or correction of any new or changing imbalance, force variation, or vibration of tire-wheel assembly. For example, spherical-shaped particles may facilitate improved rolling capabilities for improved relocation or maneuverability of any such particle of the composition within a pressurization chamber, which may improve the responsiveness of a particle to correct or reduce any new or changing imbalance, force variation, or vibration of tire-wheel assembly. By further example, non-spherical particle shapes may resist rotation by geometric resistance and/or by creating a mass or weight imbalance within a particle about the particle's central axis or center to resist rotation, which may better allow a particle to more quickly settle and position itself within the pressurization chamber to reduce or correct any new or changing imbalance, force variation, or vibration. Examples of such imbalanced particles 22 that resist rotation are shown in FIGS. 6B and 7B.

It is appreciated that a void may also form any desired shape. For example, with continued reference to FIGS. 6A and 6B, voids 40 may be ellipsoids or spheroids. Ellipsoids or spheroids include voids 40 having a spherical shape, as shown by example in FIG. 6A, or a non-spherical shape, such as is shown in FIG. 6B. As with the shape of a particle, the shape and/or positioning of any void within such particle may improve the reduction or correction of any new or changing imbalance, force variation, or vibration of the tire-wheel assembly. For example, a single symmetrical void positioned centrally (i.e., concentrically) within a particle may provide a better mass or weight balanced particle, to facilitate improved rolling capabilities for improved relocation or maneuverability of any such particle of the composition within the pressurization chamber, which may improve the responsiveness of a particle to correct or reduce any new or changing imbalance, force variation, or vibration of the tire-wheel assembly. With reference to FIG. 6A, by example, a single spherical-shaped (symmetrical) void 40 is shown within a spherical (symmetrical) particle 22 of the composition. In lieu of a centrally positioning a single symmetrical void, a plurality of voids may be arranged about the particle center to provide a balanced particle. In the alternative, a non-symmetrical void may provide a mass or weight imbalance within a particle relative to the particle's central axis or center to resist rotation, which may better allow a particle to more quickly position itself within a pressurization chamber to reduce or correct any new or changing imbalance, force variation, or vibration, and resist any unnecessary relocation due to any minor disturbance or anomaly. With reference to FIG. 6B, a non-spherical (non-symmetrical) void 40 is positioned centrally (concentrically) within a particle 22 to provide a weight imbalanced particle of the composition. It is contemplated that an unbalanced particle may include a symmetrical, centrally positioned void. For example, with reference to FIG. 6B, an unbalanced particle 22 would be provided if the single void 40 were spherical. Further, a plurality of voids may be arranged to provide a weight imbalanced particle. In any of the embodiments considered, a void may or may not be partially filled with any weighted solid or fluid.

A mass or weight imbalance within a particle 22 of the composition may also be achieved by positioning a void 40 non-centrally (i.e., non-concentrically) within a particle, such as is shown by example in FIGS. 7A and 7B. Still, voids 40 may be positioned at any location and arranged as desired within a particle 22, such as, for example, centrally (i.e., concentrically) within a particle as shown by example in FIGS. 6A and 6B. The placement of a void 40 within a particle may provide a non-uniform thickness t of body 30, such as shown by example in FIGS. 7A and 7B. It is contemplated that any combination of symmetrical and non-symmetrical particle and voids may be arranged as desired to provide balanced or unbalanced particle.

Referring now to FIG. 8, the particle 22 may comprise a body 30 formed of a first material, and a void 40 at least partially filled with a second material 50. In one embodiment, the first material may form a shell, characterized by a thickness t about a single void 40. Depending upon the position of the single void 40 within a particle 22 of the composition, body thickness t may be substantially constant or uniform, or variable. As mentioned above, envisioned that the second material 50 may comprise, for example, a tire balancing material or an energy absorbing material, such as a viscous or viscoelastic material. Further, second material 50 may form any fluid (i.e., liquid or gas), solid, or composite. The second material, for example, may comprise the compositions disclosed by Fogal in U.S. Pat. No. 7,022,753 or 6,979,060.

As shown in FIG. 9, a particle 22 of the composition may also include a plurality of voids 40 spaced as desired throughout particle body 30. For example, with continued reference to FIG. 9, voids 40 may extend entirely within body 30, or may be exposed to an exterior surface of a particle 22. Whether a particle contains a single void or multiple voids, any such void may be in communication with the exterior of particle, such as by way of any aperture or orifice extending from an exterior surface of a particle to the embedded void. For example, if any void is exposed to the air contained within a pressurization chamber, the air or other material contained within a void would not substantially compress during any particle deformation during tire operation, which would reduce any elastic rebound or response by a particle within the composition to any such deformation and thereby enhance the energy absorbing properties of the composition. Accordingly, a particle may be an open cell or closed cell particle, which may form, for example, open and closed cell sponges, foams, or other plastics or polymers. A particle having voids may also be described as having at least a second material dispersed within particle. It is contemplated that a particle may include other materials additional to second material for inclusion in any void, which may or may not contain second material.

Voids may be at least partially filled with, any desired material, which may comprise, alone or in combination, a polymer, plastic, elastomer, fluid, or metal. In particular embodiments, each such material may also comprise an energy dampening or absorbing material, which may be any viscous or viscoelastic material. Because the viscous and viscoelastic materials are less reactive (i.e., provides very little reactive bounce) than other elastic materials, particulate may more quickly become positioned along the tire, and may also better maintain any such position, during tire operation to correct tire force variations. Further, the dampening properties may also absorb any vibrations being transmitted through a tire. A viscoelastic material possesses both elastic and viscous properties. For example, when applying a load to a purely elastic material, all of the energy stored during the corresponding strain of the material is returned after the loading is removed. To the contrary, a purely viscous material does not return any of the strain energy stored after the corresponding loading is removed to provide pure damping. Accordingly, a viscoelastic material combines both elastic and viscous behaviors to provide an energy dampening material that is capable of absorbing energy, so to reduce the impact forces and vibrations acting upon, or being produced by, a tire-wheel assembly.

The dampening properties of a viscoelastic material can be quantified as having a storage modulus E' and a loss modulus E". Storage modulus E' relates to the elastic behavior (i.e., elastic response) of the viscoelastic material, while loss modulus E" relates to the viscous behavior (i.e., viscous response) of the viscoelastic material, or, in other words, the material's ability to dissipate energy. Often dampening properties are quantified by tangent delta (tan delta or tan δ), which is the ratio of loss modulus E" (i.e., viscous response) to the storage modulus E' (i.e., elastic response), or E"/E'. Tan delta is a measure of hysteresis, which is a measure of the energy dissipated by a viscoelastic elastomer during cyclic deformation (loading and unloading). The use of tangent delta to characterize the viscoelastic properties of materials is well known to one having ordinary skilled in the art. The higher the tan delta, the higher the energy loss. For a perfectly elastic material or polymer, tan delta equals zero. Tan delta is affected by temperature, as well as the structure of the material, such as, for example, the degree of crystallinity, crosslinking, and molecular mass. As the temperature experienced by a pneumatic tire is known to range from the ambient temperature to several hundred degrees during tire operation, the energy dampening material may be selected to have desired tangent delta values for use with an intended tire temperature range.

As stated before, vibrations and force variations may arise during loaded tire operation, where the forces and vibrations arise at least in part due to the tire deflecting as it enters and exits the tire footprint. Further, forces and vibrations arise when the tire impacts an object, such as a pothole or other object present on the operating or road surface. Accordingly, by providing a composition of particulate that freely operates within the pressurization chamber of a tire, particulate are able to migrate to particular interior surfaces of the tire for the purpose of correcting, at least in part, the force variations and vibrations operating within and/or upon the tire. Further, the energy absorbing properties of the composition, including the elevated energy absorbing particulate, improve the effectiveness of the composition by allowing the particulate to absorb and/or interfere with at least a portion of the vibrations (i.e., frequencies) and forces operating within and upon the tire. This not only continues to allow the particles to operate as particle dampers, whereby particles dampen the forces and vibrations by impacting the surfaces of the tire to interfere with the undesired forces and/or vibrations, it also provides a material that also dampens the forces and vibrations. Now, in effect, there are two means of dampening occurring—particle (impact) dampening, and material dampening, each of which disrupt and destructively interfere with the forces and vibrations operating upon the tire. Still further, by utilizing a dampening (energy and force absorbing) material, particles rebound less after impacting the inner tire surface or another particle, which now allows the particles to adapt and settle into place more quickly about the tire. This may also improve tire rolling resistance.

Rolling resistance is the tendency of a loaded tire to resist rolling, which is at least partially caused by the tire deflecting as it enters the tire footprint. As the tire enters the footprint, the tire deflects and the tread impacts the operating or road surface, which generates resistive forces as well as force variations and vibrations extending from the footprint. By using a composition having a set of particles that more readily absorb energy upon impact, the composition is better able to overcome a tire's tendency to resist rolling by absorbing the forces and vibrations. Further, by increasing the overall weight of the total quantity of particles present in the pressurization chamber, more momentum is provided by the particles as the tire rotates. This is beneficial to overcoming (improving) the rolling resistance of a tire, as the additional momentum is useful to overcome the forces resisting tire rotation. The overall increase in weight is provided by increasing size and mass of particles, and/or increasing the quantity of particles of the composition present within the pressurization chamber. For example, by providing 20 ounces of the particulate composition within the pressurization chamber of a 22 inch diameter tire, the particulate composition provides approximately 61 pounds of force as the tire rotates on a vehicle traveling at approximately 67 miles per hour. In comparison, providing 12 ounces of the particulate composition within the pressurization chamber of the same tire provides approximately 36 pounds of force. Accordingly, by providing more particulate composition weight within the pressurization chamber, higher levels of force variations and vibrations may be reduced and/or overcome, and rolling resistance may be reduced due to the increase in momentum, as well as the reduction in force variations and vibrations. The resultant momentum force occurring in a particulate balanced tire-wheel assembly, as opposed to a tire-wheel assembly not balanced with a particulate composition, improves the rolling resistance of the tire. In particular applications, at least approximately 6 ounces of a particulate composition are placed within pressurization chamber of a passenger car tire-wheel assembly. In other embodiments, smaller weight amounts of the particulate composition may be placed within a pressurization chamber of a motorcycle tire, for example, or larger amounts in earthmover or airplane tires, for example. It is appreciated that one or more balance weight products, such as lead weights, may also be used to correct tire or wheel mass imbalances, in concurrent use with the particulate composition for the correction of force variations and vibrations.

Figure 4:
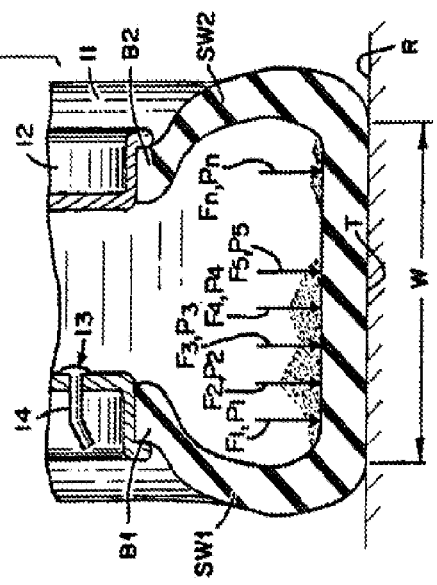
FIG. 4 is a cross sectional view of the tire-wheel assembly of FIG. 3 during rotation, and illustrates a plurality of radial load forces of different variations or magnitudes reacting between the tire and the road surface as the tire rotates, and the manner in which the particulate composition is forced in position in proportion to the variable radial impact forces.

Reference is made to FIGS. 4 and 5 which illustrate the innumerable radial impact forces (Fn) which continuously react between the contact surface R and the tread T at the lower portion or footprint FP during tire-wheel assembly rotation. There are an infinite number of such forces Fn at virtually an infinite number of locations (Pn) across the lateral width W and the length L of the footprint FP, and FIGS. 4 and 5 diagrammatically illustrate five such impact forces F1-F5 at respective locations P1-P5. As is shown in FIG. 5, it may be assumed that the forces F1-F5 are different from each other because of such factors as tire wear at the specific impact force location, the road condition at each impact force location, the load upon each tire-wheel assembly, etc. Thus, the least impact force may be the force F1 at location P1 whereas the greatest impact force may be the force F2 at location P2. Once again, these forces F1-F5 are merely exemplary of innumerable/infinite forces laterally across the tire 11 between the sidewalls SW1 and SW2 and circumferentially along the tire interior which are created continuously and which vary as the tire-wheel assembly 10 rotates.

As these impact forces are generated during tire-wheel assembly rotation, at least the second plurality of particles operate as impact or particle dampers to provide another means of dampening vibrations, frequencies, and/or resistive rolling forces at least in part due to the energy absorbing properties of the particle as may be achieved in various embodiments described herein. Subsequently, particles of composition may relocate from their initial position in dependency upon the location and the severity of the impact forces to correct any existing force variations. The relocation of the particles may be inversely related to the magnitude of the impact forces. For example, the greatest force F1 (FIG. 5) may be at position P1, and due to these greater forces F1, the particles may be forced away from the point P1 and the smallest quantity of the particles remains at the point P1 because the load force there is the highest. Contrarily, the impact force F may be the lowest at the impact force location point P2 and, therefore, more of the particles will remain thereat (FIG. 4). In other words, at points of maximum or greatest impact forces (F1 in the example), the quantity of the particulate composition 20 is the least, whereas at points of minimum force impact (point P2 in the example), the quantity of particles of composition 20 may be proportionately increased, thereby providing additional mass which may absorb and dampen the vibrations or impact forces Fn. In doing so, it is appreciated that the ratio of the first plurality of particulates to the second plurality of particulates may remain constant or may increase or decrease as desired. Accordingly, the vibrations or impact forces Fn may force the particulate composition to continuously move away from the higher or excessive impact forces F1 and toward the areas of minimum impact forces F2.

Particulates within the composition may be moved by these impact forces radially, as well as laterally and circumferentially, but if a single force and an individual particle of the composition could be isolated, so to speak, from the standpoint of cause and effect, a single particle located at a point of maximum impact force would be theoretically moved 180 degrees there from. Essentially, with an adequate quantity of particles, the variable forces create, through the impact thereof, a lifting effect within the pressurization chamber which at least in part equalizes the radial force variation applied against the footprint until there is a total force equalization circumferentially and laterally of the complete tire-wheel assembly. Thus the rolling forces created by the rotation of the tire-wheel assembly in effect create the energy or force which is utilized to locate the particles of the composition to achieve lift and force equalization and assure a smooth ride. Furthermore, due to the characteristics of the particulate composition as described herein, road resonance may be absorbed as the tire-wheel assemblies rotate.

It follows, certain embodiments of the invention comprise a method for reducing force imbalances, force variations, and/or vibrations in a tire-wheel assembly, which includes the steps of providing a tire-wheel assembly, placing into a pressurization chamber of said tire-wheel assembly a composition as contemplated in any embodiment or combination of embodiments suggested herein.

In summary, as the tire-wheel assembly is rotating, at least initially the particles of the composition tumble within the pressurization chamber of the tire-wheel assembly until the assembly and particles are subjected to sufficient centripetal force such that the particles are "pinned" to the interior surface of the tire. This can occur at approximately 10 mph in 15 inch passenger tire-wheel assemblies. In doing so, with regard to the composition, the first set of particles having low energy absorbing characteristics are employed to reduce tire-wheel assembly imbalances, while the second set of particles having elevated energy absorbing characteristics are employed to absorb energy upon impact with the tire-wheel assembly and thereby reduces force variations and/or vibrations. Energy absorption can also improve rolling resistance. In addition to performing energy-absorbing functions, the second set of particles can also assist in reducing weight imbalances in cooperation with the first plurality of particulates.

It is appreciated that the particulate forming the composition, as disclosed and contemplated herein, may be formed by any process or processes known to one of ordinary skill in the art. For example, any particulate may be formed by grinding, molding, or joining operations, such as when a particulate is formed by two pre-molded halves or independent portions of particle, such as by use of an adhesive or the like, for example.

Although the invention has been described with reference to certain preferred embodiments, as will be apparent to those skilled in the art, certain changes and modifications can be made without departing from the scope of the invention as defined by the following claims.

What is claimed is:

1. A composition for reducing weight imbalances, force variations, and/or vibrations in a tire-wheel assembly comprising:
    a first plurality of particulate for positioning within a pressurization chamber of the tire-wheel assembly and movement within the pressurization chamber during vehicle operation, where the first plurality of particulate is characterized as having lower energy absorption capabilities relative to a second plurality of particulate for positioning within a pressurization chamber of the tire-wheel assembly and movement within the pressurization chamber during vehicle operation;
    where the second plurality of particulate is characterized as having elevated energy absorption capabilities relative to the first plurality of particulate,
    where the first plurality of particulates is substantially formed of plastic(s) and where the second plurality of particulates is substantially formed of elastomeric material(s), and where each particle in the first plurality of particulate is characterized as having a specific gravity of at least 1.1 and a shore D hardness equal to or greater than 50 and where the each particle in the second plurality of particulate is characterized as having a specific gravity equal to or less than 1.3 and a shore D hardness equal to or less than 30.

2. The composition of claim 1, where each particle in the first plurality of particulate is characterized as having a specific gravity in the range of 1.1 to 1.55.

3. The composition of claim 1, where each particle in the first plurality of particulate is characterized as having a Shore D hardness in the range of 80 to 95.

4. The composition of claim 1, where the plastic(s) include a urea-formaldehyde resin.

5. The composition of claim 1, where each particle in the second plurality of particulate is characterized as having a specific gravity in the range of 1.1 to 1.3.

6. The composition of claim 1, where each particle in the second plurality of particulate is characterized as having shore D hardness in the range of 10 to 30.

7. The composition of claim 1, where the elastomeric material is formed of a natural and/or a synthetic rubber composition.

8. The composition of claim 1, where a majority of the first plurality of particulate is at least 0.841 mm in size.

9. The composition of claim 8, where substantially all of the first plurality of particulate is at least 0.841 mm in size.

10. The composition of claim 9, where substantially all of the first plurality of particulate is 0.841 mm to 1.18 mm in size.

11. The composition of claim 1, where each particle in the second plurality of particulate is sized to have a maximum dimension substantially equal to at least 0.8 mm.

12. The composition of claim 11, where each particle in the second plurality of particulate is sized to have a maximum diameter in the range of 1.0 mm to 4 mm.

13. The composition of claim 1, where one or more particulate of the second plurality of particulate includes one or more voids.

14. The composition of claim 13, where the one or more voids are at least partially filled with a filling material.

15. The composition of claim 14, where said filling material is a fluid.

16. The composition of claim 14, where said filling material is an energy absorbing material.

17. The composition of claim 1, where the plastic(s) comprise urea-formaldehyde resin and where the elastomeric material(s) comprise natural and/or synthetic rubber.

18. A method for reducing force imbalances, force variations, and/or vibrations in a tire-wheel assembly comprising the steps of:
    providing a tire-wheel assembly; and,
    placing into a pressurization chamber of said tire-wheel assembly a composition described in claim 1.

* * * * *